Patented Dec. 19, 1944

2,365,295

UNITED STATES PATENT OFFICE 2,365,295

SYNTHESIS OF AMINO ACIDS

Kurt H. Schaaf, Jamaica, N. Y., and Frank D. Pickel, Newark, N. J., assignors to National Oil Products Company, Harrison, N. J., a corporation of New Jersey No Drawing. Application July 15, 1941, Serial No. 402,558

6 Claims. (Cl. 260—534)

This invention relates in general to the preparation of amino acids and in particular to the synthesis of β-alanine.

With the discovery of the physiological activity of pantothenic acid and particularly the determination of the chemical structure of pantothenic acid, β-alanine has become a chemical of major importance. In the synthesis of pantothenic acid β-alanine or a derivative thereof such as the salt or ester is condensed with α hydroxy ββ dimethyl butyrolactone. β-alanine also constitutes a portion of carnosine which may be synthesized by condensing β-alanine with histidine. β-alanine has been known for many years as have processes for preparing the same. However, the heretofore known processes for preparing this amino acid have been quite inefficient and costly due to the low yields obtained.

One method involves generally dissolving an ester of cyanoacetic acid in alcohol containing a relatively small proportion of concentrated sulfuric acid and subjecting the mass to the action of hydrogen. After the calculated amount of hydrogen is taken up, the alcohol is removed and the resulting β-amino propionic ester sulfate dissolved in water and saponified under reflux and the sulfate removed with barium hydroxide. The yields of β-alanine obtained by the aforementioned process are exceedingly low, i. e. in the order of about 16% of the theoretical value.

The general object of the present invention is to obviate the difficulties encountered in the synthesis of amino acids.

A specific object of the invention is to provide an improved and commercially practical process for the synthesis of β-alanine.

Another object of the invention is to provide an improved process of synthesizing β-alanine, whereby yields approximating stoichiometrical values are obtained.

Other objects of the invention will in part be obvious and will in part appear hereinafter.

We have now discovered that the foregoing objects may be accomplished by catalytically hydrogenating the cyano derivative of a lower fatty acid or fatty acid derivative in the presence of acetic acid and an inorganic acid. In the synthesis of β-alanine (β-amino proprionic acid) cyanoacetic acid or a derivative thereof such as the ester, amide or any other suitable derivative of the carboxyl group of the acid is used as the starting material. Of course in the synthesis of other amino acids, such, for example as γ-amino butyric acid, α-amino valeric acid, etc., the corresponding cyano derivative of the acid will be used as the starting material.

The invention accordingly comprises the several steps and the relation of one or more of such steps with respect to each of the others thereof, which will be exemplified in the process hereinafter disclosed, and the scope of the invention will be indicated in the claims.

In view of the fact that we are primarily concerned at this time with the synthesis of β-alanine, our specific description will be directed to this process, although it is to be understood that several lower fatty acids having a terminal amino group may be efficiently produced in accordance with the broader aspects of our invention. In the synthesis of β-alanine according to the process of the invention, the starting compound used may be selected from the group consisting of cyanoacetic acid or any suitable derivative of the carboxyl group thereof, such as the ester, amide or the like. We have found that the use of a lower alkyl ester of cyanoacetic acid as the starting compound gives the best results; hence the use of such esters is highly preferred. While cyanoacetic acid may be used as the starting compound in accordance with the invention, this acid is very hygroscopic and it is difficult to purify the same. On the other hand the esters of cyanoacetic acid are not hygroscopic and they can be readily obtained or produced in purified form. The esters may be purified by simple distillation, whereas the acid must be recrystallized several times to arrive at the same degree of purity. Moreover, the yield of β-alanine is dependent to a substantial degree on the quantity of moisture present during the hydrogenation step. In other words, the less moisture present the more efficient the operation of the process becomes; thus it is highly advantageous to employ a non-hygroscopic material.

Any suitable ester of cyanoacetic acid may be used in the process, the lower alkyl esters such as the methyl and ethyl esters being highly preferred. Other lower alkyl esters of cyanoacetic acid, such as the propyl, isopropyl, butyl, isobutyl, amyl, isoamyl, etc. esters may be used to effect the purposes of the invention. The salient feature of the process of the invention which goes for the success of the same resides in the step of catalytically hydrogenating the cyanoacetic acid or derivative thereof in the presence of an inorganic acid and acetic acid. In preparing the mixture for hydrogenation the cyanoacetic acid ester is admixed with the inorganic acid and acetic acid in any suitable manner, the order of admixing the three substances being of no significant importance. The purpose of including an inorganic acid is to form a salt with the amino group upon formation thereof during the reduction of the nitrile. By so forming the salt the production of secondary and tertiary amines is obviated. While any suitable inorganic acid may be employed, such as concentrated hydrochloric, phosphoric and the like acids, the use of sulfuric acid, and particularly the monohydrate or 98% sulfuric acid is highly preferred. The inorganic acid should be present in an amount at least chemically equivalent to that of the cyano compound. While a lesser quantity of inorganic acid may be used, better yields are obtained when at least an equivalent amount or more based on the cyano compound is used. The quantity of acetic acid present may be varied within wide limits depending on the size of the batch being produced and other variable conditions. It has been found that the best results are obtained if the quantity of acetic acid used lies within the range of 5 to 20 parts by weight for each part by weight of the cyano compound. As aforementioned, best results are obtained if the mass undergoing hydrogenation is maintained as free from moisture as possible; consequently the use of glacial acetic acid is highly preferred. In commercial operations the acetic acid should not contain more than about 3% or 4% moisture, and preferably the moisture content should be less than 2%.

After the aforementioned constituents have been admixed, a platinum catalyst (platinum oxide) is added and the mass contacted with hydrogen under a gauge pressure varying from 1 to about 5 atmospheres. While higher pressures may be resorted to, it has been found that excellent results are obtained at these lower pressures; consequently high pressure operations are not necessary. The temperature of the mass undergoing hydrogenation should preferably be maintained within the range of about 15° C. to 40° C. as hydrolysis of the nitrile very often occurs above 40° C. The quantity of platinum oxide employed may be varied within a wide range depending upon the size of the batch being produced. In commercial operations about one part by weight of catalyst per each mole weight of cyano compound present has proved satisfactory.

In order to illustrate the chemistry involved during hydrogenation the following equation is given wherein an ester of cyanoacetic acid is employed as the starting compound (R indicating the alkyl group):

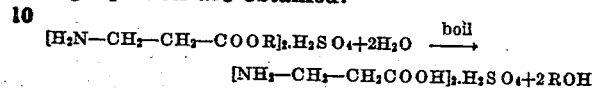

After hydrogenation has proceeded to the desired degree, that is, when substantially all the nitrile has been reduced to the amine, hydrogenation is arrested and the acetic acid removed from the mass by any suitable means. Removal of the acetic acid is preferably effected by means of distillation under sub-atmospheric pressures. Subsequent to the removal of the acetic acid the reaction product is hydrolyzed to eliminate the ester group, thus producing the inorganic acid salt of β-alanine. This hydrolysis step is preferably carried out by boiling the reaction mass with water whereby the results shown by the following equation are obtained:

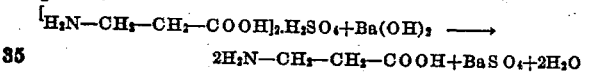

Upon completion of hydrolysis the mass is neutralized by means of any suitable alkaline agent. In accomplishing the neutralization during which the salt (sulfate) is removed it is desirable to employ an alkaline agent which will yield a water-insoluble salt which precipitates out from the mass. Various alkaline agents may be used such as the oxides or hydroxides of calcium, magnesium, barium and the like. In practice it is highly preferred to use barium hydroxide as barium sulfate is highly insoluble in an aqueous medium. The amount of alkaline agent should be just sufficient to remove the sulfate and neutralize any excess sulfuric acid that may be present. The expression "neutralizing the sulfuric acid" is employed herein to connote the removal of the sulfate group as well as neutralize any excess sulfuric acid that may be present. During neutralization the following reaction takes place:

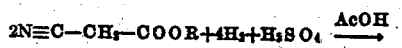
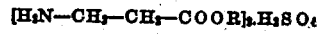

The insoluble precipitate is then separated from the β-alanine solution, the latter being evaporated to dryness whereby a white solid results. The β-alanine may, if desired, be redissolved in hot water, an alcohol added to the aqueous solution until turbidity results. Upon cooling β-alanine crystals separate out.

For a fuller understanding of the nature and objects of the invention, reference should be had to the following examples which are given merely to further illustrate the invention and are not to be construed in a limiting sense; all parts given being by weight:

*Example I*

5 parts of methyl cyano acetate were dissolved in 42 parts of glacial acetic acid and 4.6 parts of concentrated (98%) sulfuric acid were added. The solution in the presence of 0.1 part of platinum oxide was contacted with hydrogen at room temperature and under a gauge pressure of 28.1#/sq. in. for 1 and ¾ hours during which the absorption of hydrogen was complete. The catalyst was filtered off and the filtrate evaporated under reduced pressure leaving a heavy, oily liquid. This residue was dissolved in 25 parts of distilled water and the solution refluxed for two hours to decompose the ester. The mass was quantitatively neutralized with a hot solution of barium hydroxide, care being taken that the barium hydroxide was not added in excess. The barium sulfate was filtered off and the filtrate evaporated to dryness under reduced pressure, leaving a white solid residue. This residue was dissolved in the minimum amount of hot distilled water, and ethanol was added (about 3 to 4 times the amount of water used) until turbidity resulted. Upon cooling of the mass the β-alanine separated out as crystals which were removed by filtration. The mother liquor was further worked up by evaporating again to dryness, redissolving the residue in the minimum amount of hot water and adding alcohol to turbidity. The total yield of β-alanine was 2.94 parts, or 65% of the theoretical yield.

Example II 5.7 parts of distilled ethyl cyano acetate, 42 parts of glacial acetic acid and 4.6 parts of concentrated (98%) sulfuric acid were admixed. The solution to which there was added 0.1 part of platinum oxide was contacted with hydrogen for a period of 1 and ¾ hours. The gauge pressure employed was 28.2#/sq. in. and the temperature 22° C. The theoretical amount of hydrogen was absorbed, the catalyst was filtered off and the filtrate evaporated under reduced pressure, leaving a heavy, oily liquid which was worked up in the same manner as the residue obtained in Example I. The yield of β-alanine was 3.59 parts, or 80% of the theoretical yield.

Example III 4.3 parts of recrystallized cyanoacetic acid were dissolved in 42 parts of glacial acetic acid. To the solution 4.6 parts of concentrated (98%) sulfuric acid were added. The solution to which there was added 0.1 part platinum oxide was subjected to hydrogenation for a period of four hours. The temperature was maintained at about 22° C. and the pressure at 28.5#/sq. in. gauge. Only about 80% of the theoretical amount of hydrogen was absorbed. The catalyst was filtered off and the filtrate evaporated to dryness under reduced pressure, leaving a viscous liquid. This was dissolved in water and the solution treated with hot barium hydroxide solution to remove the sulfuric acid and sulfate quantitatively. The barium sulfate was filtered off and the filtrate then worked up in the same manner as the filtrate obtained in Example I. The yield of β-alanine was found to be 1.99 parts, or 44% of the theoretical yield.

As aforementioned, it is highly preferred to use as the starting material a lower alkyl ester of cyanoacetic acid and preferably the methyl or ethyl esters or a mixture of the two. The expression "cyanoacetic acid compound" is used herein in a generic sense to include the cyano acid, as well as the esters, amides and like derivatives of the acid. The expression "aliphatic cyano acid compound" is used in a like sense, but also includes as a class the cyano derivatives of the lower aliphatic monocarboxylic acids. From the foregoing it is apparent that the process of the invention makes possible the efficient production of the lower amino acids and particularly β-alanine. The yields of β-alanine according to the present invention run from three to five times higher than that of prior known processes. Moreover, the β-alanine may be recovered in a highly purified crystal form.

Since certain changes may be made in carrying out the above process without departing from the scope of the invention, it is intended that all matter contained in the above description shall be interpreted as illustrative and not in a limiting sense.

It is also to be understood that the following claims are intended to cover all the generic and specific features of the invention herein described, and all statements of the scope of the invention, which as a matter of language might be said to fall therebetween.

Having described our invention, what we claim as new and desire to secure by Letters Patent, is:

1. In a process of synthesizing β-alanine the step which comprises catalytically hydrogenating a lower alkyl ester of cyanoacetic acid in the presence of sulfuric and acetic acids.

2. In a process of synthesizing β-alanine the step which comprises catalytically hydrogenating a lower alkyl ester of cyanoacetic acid in the presence of concentrated sulfuric and glacial acetic acids.

3. In a process of synthesizing β-alanine the step which comprises catalytically hydrogenating a lower alkyl ester of cyanoacetic acid in the presence of concentrated sulfuric and glacial acetic acids, the quantity of sulfuric acid present being at least the chemical equivalent of the cyanoacetic acid ester, and the acetic acid being present in an amount equivalent to 5 to 20 times that of the cyanoacetic acid ester.

4. A process of synthesizing β-alanine which comprises admixing a lower alkyl ester of cyanoacetic acid with at least the chemical equivalent of concentrated sulfuric acid and 5 to 20 parts of glacial acetic acid per part of ester, catalytically hydrogenating the ester, removing the acetic acid from the mass, hydrolyzing the ester, neutralizing the sulfuric acid quantitatively with barium hydroxide and separating the β-alanine from the barium sulfate precipitate.

5. The process of claim 4 wherein the hydrogenation is carried out within the gauge pressure range of 1 to 5 atmospheres and within the temperature range of 15° C. to 40° C.

6. A process of synthesizing β-alanine which comprises preparing a solution containing a lower alkyl ester of cyanoacetic acid, at least the chemical equivalent amount of concentrated sulfuric acid and 5 to 20 parts of glacial acetic acid based upon the weight of the ester, subjecting the solution to the action of hydrogen in the presence of platinum oxide to convert the nitrile group to an amino group, removing the acetic acid from the mass, hydrolyzing the mass by boiling with water, neutralizing the sulfuric acid quantitatively with a hot barium hydroxide solution, removing the β-alanine solution from the barium sulfate precipitate, evaporating the β-alanine solution to dryness, dissolving the β-alanine in a relatively small quantity of hot water, adding a lower aliphatic alcohol until turbidity results and cooling the mass to effect crystallization of the β-alanine.

KURT H. SCHAAF.
FRANK D. PICKEL.